United States Patent [19]

Brazel

[11] 4,390,583
[45] Jun. 28, 1983

[54] ALUMINA-ALUMINA COMPOSITE

[75] Inventor: James P. Brazel, Berwyn, Pa.

[73] Assignee: General Electric Company, Philadelphia, Pa.

[21] Appl. No.: 350,776

[22] Filed: Feb. 22, 1982

[51] Int. Cl.³ .............................................. B32B 5/12
[52] U.S. Cl. ..................................... 428/113; 264/60;
264/63; 264/86; 428/105; 428/364
[58] Field of Search .............. 428/113, 221, 902, 910,
428/408, 105, 364, 375, 107, 109, 367; 427/224,
385.5, 430.1, 380; 156/296; 264/60, 63, 86

[56] References Cited

U.S. PATENT DOCUMENTS

| 3,573,150 | 3/1971 | Broutman et al. | 428/105 |
| 4,092,194 | 5/1978 | Green | 156/89 |
| 4,168,337 | 9/1979 | Maistre | 428/364 |
| 4,209,560 | 6/1980 | Vasilos | 428/109 |
| 4,268,560 | 5/1981 | Maistre | 428/107 |
| 4,268,562 | 5/1981 | Bacon et al. | 428/113 |
| 5,252,588 | 2/1981 | Kratsch et al. | 156/73.6 |

Primary Examiner—James J. Bell
Attorney, Agent, or Firm—Allen E. Amgott

[57] ABSTRACT

Multifilament fibers of alumina are fabricated into a multi-directional preform which is densified through repeated infiltration with an aqueous solution of colloridal alumina, dried and fired.

10 Claims, 2 Drawing Figures

ALUMINA-ALUMINA COMPOSITE

BACKGROUND OF THE INVENTION

1. Field of the Invention

This invention related generally to composite materials and more particularly to an alumina-alumina composite.

2. Description of the Prior Art

Alumina (aluminum oxide) $Al_2O_3$ is a well known ceramic which is used in applications requiring electrical insulation and/or high temperature operation. When fabricated in a hot-pressed polycrystalline form it has sufficiently good mechanical properties to serve as a structural component for such purposes as laboratory ware, furnace liners and high power vacuum tube insulators. It has also been employed, by using careful design, as a missile antenna window or radome.

Single crystals of sapphire (crystalline alumina) have been used as windows in armored tanks because of the transparency of this crystal to visible portions of the electromagnetic spectrum, as well as its high indentation hardness which provides protection from small arms fire.

Both of these familiar forms of alumina ceramics, polycrystalline and monocrystalline (sapphire) suffer two limitations to their broader use in structural applications where large temperature gradients may be created in parts fabricated from these forms of alumina:

1. They are brittle ceramics, i.e. they fracture at very low strain levels typically less than 0.1%. Thus although they may have high intrinsic tensile strengths they fracture at low strain values and the integrated product of their stress-strain or "fracture toughness" is low.
2. Because of the relatively high coefficient of thermal expansion of alumina, ($4.3 \times 10^{-6}/°F$. vs. $0.5 \times 10^{-6}/°F$. for fused silica) high thermal strains are caused in alumina structures in which temperature gradients exist. The low strain capability thus makes them extremely sensitive to thermal shock failure.

Previously, structures have been disclosed which are intended to solve the problem of poor resistance to mechanical and thermal shock of alumina bodies. In U.S. Pat. No. 4,092,194 a yarn of refractory oxide fibers, which may be $\alpha$-alumina, is wound on a tubular core. A coating is placed on the wound tube and fired to form a refractory oxide matrix. Different approaches to the matrix fabrication are disclosed. In one approach, a refractory oxide precursor such as alumina hydrate is used to form the coating which is fired. In another approach, an aqueous solution, suspension, dispersion, slurry, emulsion or the like which contains particles of one or more oxides or oxide compounds is used as the coating which is fired. The foregoing patent structure technique is somewhat limited in usefulness however because the fibers extend in only two basic directions.

Three directional (3D) and higher number directional structures which have been fabricated from fiber type materials have also been disclosed and are shown generally in U.S. Pat. No. 4,252,588. The material which has been disclosed in this patent is however a carbon which is not suitable for use in many places where oxide ceramics are used.

In U.S. Pat. No. 4,268,562 a composite is disclosed which uses alumina fibers in a glass matrix. A two directional structure is fabricated by joining layers of coated fibers.

It is therefore an object of this invention to provide an alumina-alumina structure having fiber reinforcement in at least three directions.

It is also an object of this invention to provide a three directional alumina-alumina structure capable of being machined to a desired configuration.

It is a further object of this invention to provide an alumina-alumina structure which is resistant to fracture by thermal expansion or mechanical shock.

It is also an object of this invention to provide an alumina-alumina composite having improved mechanical strain characteristics.

It is a still further object of this invention to provide an alumina-alumina composite having a high dielectric quality (high electric resistance) for use as an electrical insulator, including use as a radar-transmitting window.

SUMMARY OF THE INVENTION

Multifilament fibers of $\alpha$-alumina are arranged in a three or greater directional preform. The preform is infiltrated with an alumina sol and heated to form an alumina matrix around the fibers and interspersed among the filaments.

DESCRIPTION OF THE PREFERRED EMBODIMENT

"Directions" as used herein relating to fibers, or fibers temporarily stiffened to form rods, refers to the orientation of the fibers or rods at a discrete point in the composite. Thus a three directional (3D) composite will normally have the fibers or rods oriented in x, y and z directions, as these designations are conventionally used. The directions of the fibers in the composite also contemplate slight deviations from an exact orientation. For example, 3D also contemplates a structure wherein a conical body may have an alumina-alumina composite fabricated thereon or to fit thereon, so that one fiber direction may be circumferential, a second may be parallel to the slope of the cone, and the third may be orthogonal to the scope of the cone. When viewed at any point this slight deviation from three mutually orthogonal direction is not apparent.

It is also contemplated that the fibers in two or more directions may be woven.

Fibers of $\alpha$-alumina filaments are obtainable commercially for example from E. I. duPont deNemours, Inc. which are identified as FP fibers. These fibers are described in the aforementioned U.S. Pat. No. 4,268,562. These fibers are conventionally supplied by the manufacturer with an acrylic finish or "sizing" to facilitate general handling. For the purposes of enhancing assembly into a multidirectional (3D, 4D or higher order) preform, additional resin impregnation is made to more completely consolidate the fiber. This resin can later be completely removed (to the extent that electrical properties are not affected by residual carbon) by pyrolysis at some stage in the composite densification. The coated fibers are pulled through a die to remove excess resin and leave a rigidized rod of substantially uniform cross-section, either round, square, rectangular, hexagonal or other shape; with filaments uniformly and closely packed in the fiber rod.

Figure 1:
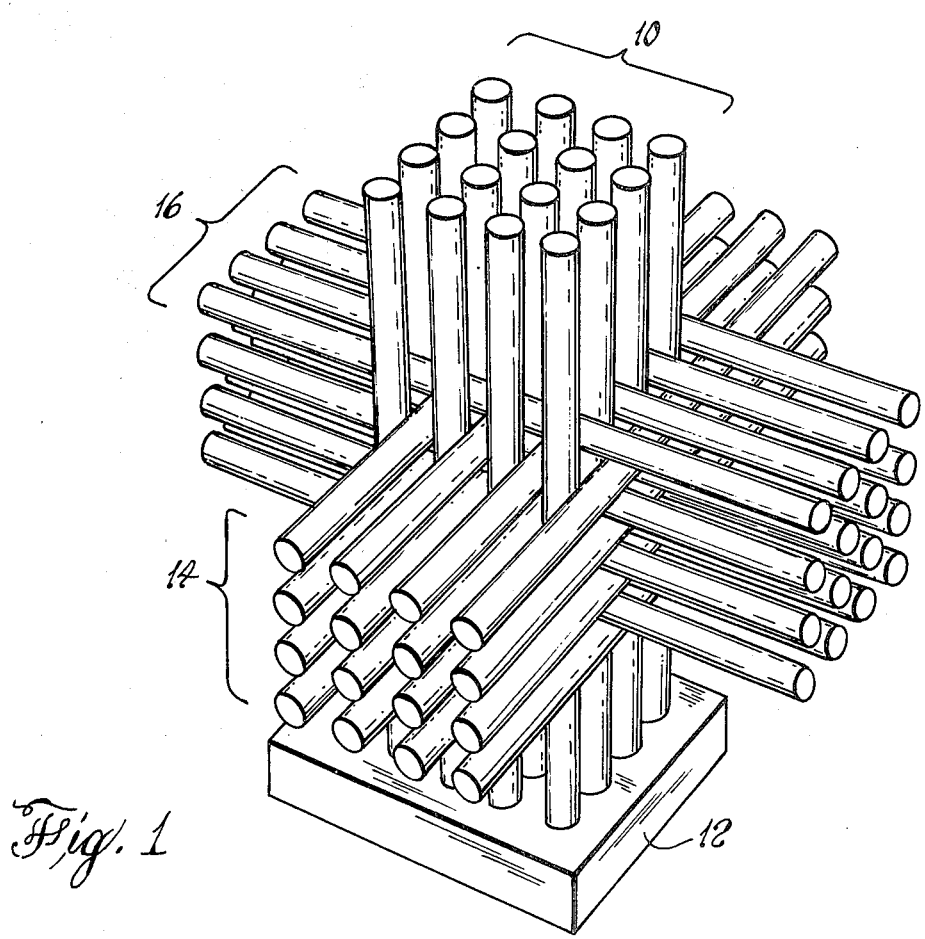
FIG. 1 is a schematic showing a preform of alumina fibers.

As shown in FIG. 1, a first set of rods 10 is positioned in a base 12. Base 12 is a fixture used in fabrication having holes to receive rods 10. These holes are positioned so that a second set of rods 14, and a third set of rods 16, may be tightly positioned between rods 10. It should be evident that FIG. 1 with sixteen rods in each set is merely for purposes of illustrating clearly the fabrication process. For example, one structure made in accordance with the invention utilized a total of about 10,000 rods arranged in three directions.

The structure as shown in FIG. 1 is made as tight as possible by forcing the various rows firmly into position. The structure as thus formed is called a preform.

The preform is next infiltrated with the precursor of the composite matrix. In a preferred form, an aqueous sol of alumina is employed as a bath into which the preform is immersed. (The sol is a colloidal suspension of alumina in water). The water is removed in an evacuated chamber and is then heated to about 90° C. for approximately four hours to completely dry the preform. It is then heated to about 800° C. for 16 hours to consolidate the alumina matrix in the preferred physical state, i.e. a glassy morphology with slight content of gamma-alumina. In this form the alumina ceramic matrix is intended to impart the desired composite interfiber shear interaction. Specifically, a much lower firing temperature produces insufficient fiber-matrix interaction; a much higher one produces lower strain and strength, ultimately embrittlement.

The cycle of infiltration, drying and firing is repeated until the desired densification is achieved. Nominally, bulk densities of 1.9 gm/cc or higher are achieved.

The consolidated composite body can be handled with conventional ceramic methods as regards shipping, storage and environmental considerations. It can be machined into structural shapes using conventional carbide tooling and machine shop practice, although diamond bits are preferred for tool wear considerations. In the preferred embodiment an axial tensile strength of 10,000 psi is achieved, with Young's modulus of 4 million psi or greater and tensile strain capability of 0.2% or greater.

Figure 2:
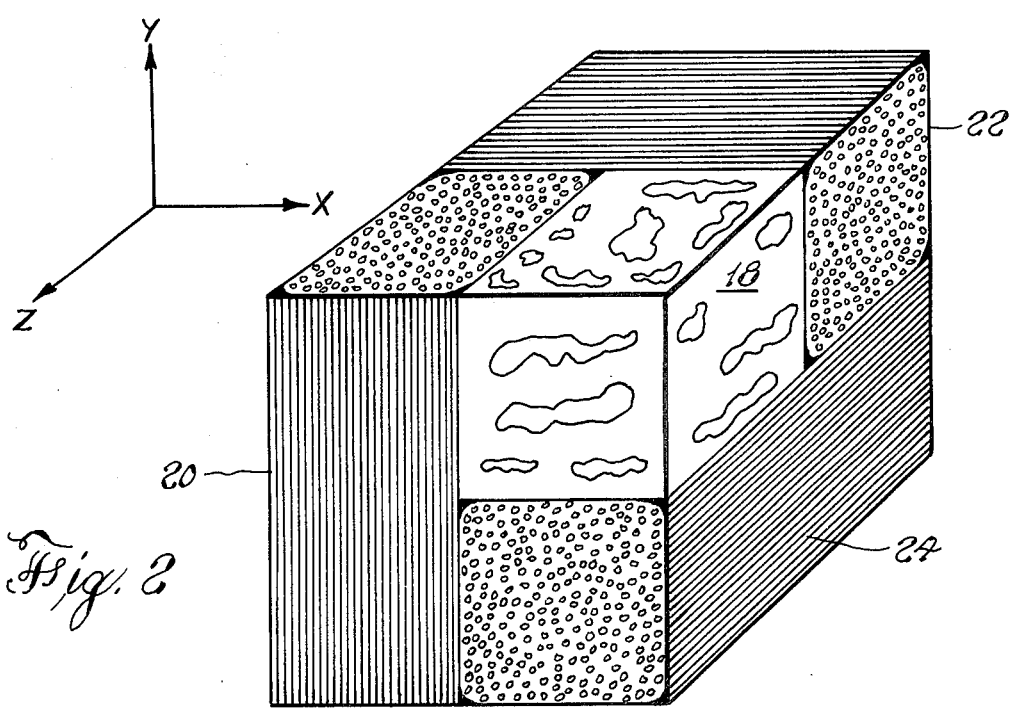
FIG. 2 shows in section a portion of a solid structure in accordance with the invention.

In FIG. 2, a fragmentary cross-section is shown of a three directional structure after it has been densified. The matrix material 18 is located not only in the interstitial space between square fibers 20, 22 and 24, but also between the filaments which compose the fibers. Note that the fibers have been formed to have a square cross-section and that some voids appear in the matrix material.

Although particular embodiments of an alumina-alumina composite and a method of fabricating it have been illustrated and described, it will be obvious that changes and modifications can be made without departing from the spirit of the invention and the scope of the appended claims.

I claim:

1. An alumina-alumina composite comprising:
    a plurality of alumina fibers arranged parallel to at least three axial directions;
    each of said fibers comprising a plurality of alumina filaments in a matrix of alumina; and
    said plurality of fibers further contained in an alumina matrix.

2. An alumina-alumina composite comprising:
    a plurality of alumina fibers oriented in at least three directions in a regular pattern with the fibers oriented in one direction positioned adjacent to fibers oriented in at least two of the other directions;
    a matrix of alumina enveloping said fibers and interspersed between the filaments forming said fibers;
    said fibers being a polycrystalline form of alumina; and
    said matrix being a combination of glassy and gamma forms of alumina.

3. An alumina-alumina composite in accordance with claims 1 or 2 wherein:
    said fibers are α-alumina.

4. An alumina-alumina composite in accordance with claims 1 or 2 wherein:
    said matrix is predominantly a non-crystalline form of alumina.

5. An alumina-alumina composite in accordance with claim 2 wherein:
    one of said directions is circumferential.

6. An alumina-alumina composite in accordance with claim 2 wherein:
    said fibers are multi-filament.

7. The method of fabricating a three-dimensional alumina-alumina composite comprising:
    assembling a plurality of alumina fibers into a preform wherein said fibers have at least three directions; and
    forming an alumina matrix on said preform by repeated cycles of:
    a. infiltration with a sol of alumina, and
    b. heating the infiltrated preform.

8. The method of fabricating a three dimensional alumina-alumina composite comprising:
    forming a plurality of rigidized rods of alumina by coating a fiber having a multiplicity of α-alumina filaments with a temporary binder drawing said rods through a protrusion die, and drying the binder;
    assembling said rigidized rods into a preform structure in which said rods are positioned in a parallel arrangement with at least three directions;
    removing said temporary binder by pyrolyzing; and
    forming an alumina matrix on said preform by repeated cycles of:
    a. infiltration with a sol of alumina,
    b. drying to remove the liquid, and
    c. firing said structure.

9. The method of fabricating a three dimensional alumina-alumina composite comprising:
    forming a plurality of rigidized rods of alumina by coating a fiber having a multiplicity of alumina filaments with an acrylic resin, drawing said rods through a protrusion die, and drying the resin;
    assembling said rigidized rods into a preform structure in which said rods are positioned in a parallel arrangement with at least three directions; and
    forming an alumina matrix on said preform by repeated cycles of:
    a. infiltration with an aqueous solution of colloidal alumina,
    b. drying to remove the water, and
    c. firing said structure.

10. The method in accordance with claim 7, 8 or 9 wherein:
    said fiber is α-alumina.

* * * * *